US009973830B1

(12) United States Patent
Shetty

(10) Patent No.: US 9,973,830 B1
(45) Date of Patent: May 15, 2018

(54) SUPPORTING VIDEO AD SERVING INTO VIDEO STREAMS

(71) Applicant: Interactive Advertising Bureau, Inc., New York, NY (US)

(72) Inventor: Amit Shetty, Los Gatos, CA (US)

(73) Assignee: Interactive Advertising Bureau, Inc., New York, NY (US)

( * ) Notice: Subject to any disclaimer, the term of this patent is extended or adjusted under 35 U.S.C. 154(b) by 6 days.

(21) Appl. No.: 15/397,191

(22) Filed: Jan. 3, 2017

(51) Int. Cl.

| | |
|---|---|
| ***H04N 21/81*** | (2011.01) |
| ***H04N 21/442*** | (2011.01) |
| ***H04N 21/234*** | (2011.01) |
| ***H04N 21/2343*** | (2011.01) |

(52) U.S. Cl.
CPC ..... *H04N 21/812* (2013.01); *H04N 21/23418* (2013.01); *H04N 21/23424* (2013.01); *H04N 21/234309* (2013.01); *H04N 21/442* (2013.01)

(58) Field of Classification Search
CPC .......... H04N 21/812; H04N 21/23424; H04N 21/23418; H04N 21/23439; H04N 21/442; H04N 21/234309; H04N 21/25891; H04N 21/44016; H04N 21/4532; H04N 21/6125; H04N 21/25435; H04N 21/2387; G06Q 30/0277; G06Q 30/0251; G06Q 30/0269; G06Q 30/0255; G06Q 30/0241
USPC .......................................................... 725/32
See application file for complete search history.

(56) References Cited

U.S. PATENT DOCUMENTS

| | | | | | |
|---|---|---|---|---|---|
| 2013/0227607 | A1 * | 8/2013 | Saltonstall | ........... | H04N 21/458 725/35 |
| 2013/0268963 | A1 * | 10/2013 | Nugent | ................ | H04N 21/435 725/32 |
| 2015/0120470 | A1 * | 4/2015 | Roever | ............. | G06Q 30/0267 705/14.73 |

(Continued)

OTHER PUBLICATIONS

Iab. Video Ad Serving Template (VAST) Version 3.0, Published Jul. 19, 2012, pp. 9-14, 17-18, 20, 27, 30, 48-49, 54-55, 67 and 70.*

(Continued)

*Primary Examiner* — Nathan Flynn
*Assistant Examiner* — Cynthia Fogg
(74) *Attorney, Agent, or Firm* — Lowenstein Sandler LLP

(57) ABSTRACT

An implementation of the disclosure provides a method. The method comprises receiving, by a processing device, a request for a video advertisement associated with a client device coupled to a network. The request comprises playback attributes of the client device. A video ad-serving template (VAST) data structure is generated for the video advertisement based on the request. An ad content item is identified based on the VAST data structure. The ad content item comprises information characterizing the video advertisement that includes a rich media, mezzanine and interactive components. The ad content item is transcoded into a plurality of transport streaming items comprising a representation of the video advertisement in context with the playback attributes associated with the request and the VAST data structure. Thereupon, the plurality of transport streaming items associated with the representation of the video advertisement is provided to integrate into streaming video content associated with the client device.

20 Claims, 5 Drawing Sheets

(56) References Cited

U.S. PATENT DOCUMENTS

| | | | | |
|---|---|---|---|---|
| 2015/0325268 | A1* | 11/2015 | Berger | H04N 21/26258 386/248 |
| 2016/0198238 | A1* | 7/2016 | Hajiyev | H04N 21/42201 725/12 |
| 2017/0032412 | A1* | 2/2017 | Scharber | G06Q 30/0248 |

OTHER PUBLICATIONS

Iab.Tech Lab, Video Ad Serving Template (VAST) Version 4.0, Released Jan. 21, 2016, Corrections and clarifications (Section 7) added Apr. 2016, pp. 6-7, 11, 13-14, 25, 27, 43-44 and 66.*

IAB Tech Lab Releases VAST 4.0 for Public Comment, Nov. 2, 2015, iab., (https://www.iab.com/news/iab-tech-lab-releases-vast-4-0-for-public-comment/), pp. 1-3.*

Tribbey, Chris. "The All-Too-Slow Move to Adopt Ad Identifiers", Aug. 8, 2016, Broadcasting Cable, (http://www.broadcastingcable.com/news/next-tv/all-too-slow-move-adopt-ad-identifiers/158661), pp. 1-3.*

IAB Digital Video Committee, "Video Ad Serving Tamplate (VAST)", Version 4.0, iab.Tech Lab, Jan. 21, 2016, 74 pages.

* cited by examiner

SUPPORTING VIDEO AD SERVING INTO VIDEO STREAMS

TECHNICAL FIELD

The disclosure is generally related to streaming content presentation systems, and is more specifically related to, supporting video ad serving into video streams.

BACKGROUND

With the adoption of high-speed network links, the consumption of video content over the Internet has experience exponential growth. As a result, more and more users have shifted to accessing video content through Internet-connected devices that are capable of reaching a variety of video content sources throughout the world. In connection with this shift of viewing habits to access Internet-based video content, content providers have sought to help monetize such video delivery by incorporating video-based advertisements into the content provided to users. There are, however, many different formats for the video content and numerous types of players for playing this content. This makes it difficult to address the placement of these video advertisements within a piece video content without introducing adverse playback effects for the users.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The disclosure is illustrated by way of examples, and not by way of limitation, and may be more fully understood with references to the following detailed description when considered in connection with the figures, in which.

DETAILED DESCRIPTION

Figure 1:
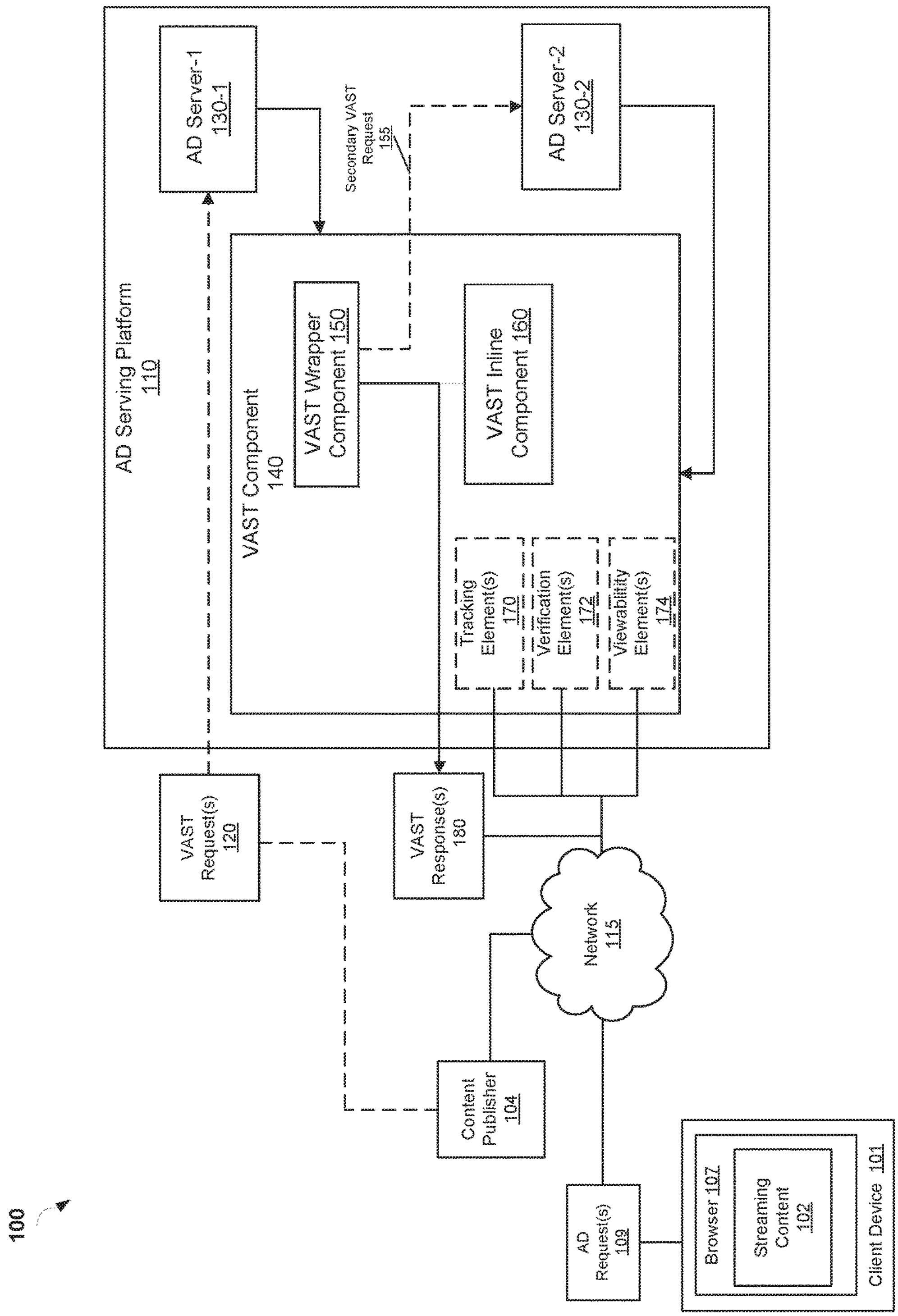
FIG. 1 depicts a high-level component diagram of a networked computing system in accordance with one or more aspects of the disclosure.

Implementations of the disclosure describe supporting video ad serving into video streams. Video ads (also referred to as video advertisements) may include digital content items that can be displayed in various forms on consumer client devices, such as a digital video player, mobile phone, template device, computer, etc. The digital content items may include rich media, for example, text, graphics, still-images, video, audio, audio and video, banners, links (e.g., a hyperlink to an advertiser's website), and other types of content and related data. In some cases, the video advertisements can be presented within video content, such as streaming video provided to the consumer device. For example, an ad sever may provide the video advertisements for inclusion in video content in response to a request from a content provider associated with the content.

In order to serve video ads from the ad server to different content providers a common in-stream advertising protocol may be used. For example, the Interactive Advertising Bureau's (IAB's) Video Ad Serving Template (VAST) specification is a universal schema for serving ads to digital video players, and describes expected video player behavior when executing VAST-formatted video ads. IAB introduced the first version of VAST to the video advertising marketplace, which has since been widely adopted throughout the industry. In this regard, VAST provides a protocol for communication requirements that enables ad servers to use a single ad response (e.g., a VAST data structure) to be served for in-stream video across various VAST compliant video players.

As a template for ads served to a video player, VAST offers a set of instructions for developers to program digital video players to process VAST-formatted ads. A challenge, however, for many providers (e.g., broadcasters) that produce video content for these players is the lack of control in how VAST is implemented by the developers for the different video players. For example, some developers may have ignored or not implemented certain VAST protocols due to the particular system requirements and playback capabilities of a given video player. When a VAST ad response is included in the video content, performance may sometime be slow and/or contain a certain amount of latency in load times depending on the type of player receiving the response. Because of this, the user may encounter a delay or a malfunction in their viewing experience (e.g., a pixelization or distortion in a display of the video advertisement and/or video content). In other situations, the VAST ad response may include some interactive components (e.g., software logic that is executed as part of the ad playback) that may not be supported by the capabilities of a given video player. In such cases, the ad vendor may want a way to separate the video portion of the ad from its interactive components to ensure the ads can play in systems that cannot execute the interactive components and more efficiently in players that are equipped to handle these interactions.

This disclosure provides methods and systems to improve the interconnectivity between video advertisements and a video content stream in order to display the combination more successfully across different platforms and devices. In some aspects, the techniques disclosure herein provide support for high-quality video formats to provide for long-form video content and sever side tracking when ad-stitching service are leveraged to reach various kinds of devices. An advantage of techniques is that it helps reduce any adverse playback artifacts associated with the combination (of video ads and video content) even at players having limited capabilities. In some implementations, a system of the disclosure may generate a VAST data structure (also referred to as a VAST tag) that provides a separate video component from any creative interactive API components associated with a video ad. This allows an ad-serving service to improve the interactive ad experience in video players particularly in situations where the players cannot execute the interactive API components. In some implementations, the ad-serving platform may also serve several video files along with the VAST data structure to ensure that the video advertisement can always be played.

To support serving of video advertisements across different video platforms, the VAST data structure may include a mezzanine component associated with the advertisements. In some implementations, the mezzanine component may include a raw video data at a high quality, high-data-rate digital information describing, or otherwise representing audio/visual content of the video advertisement. The ad-serving platform may extract the mezzanine component from the VAST data structure and use it to generate a plurality of streaming ad content items representing the video advertisement. In this regard, the streaming ad content items may be generated at appropriate quality levels in context with the capabilities of the environment of the video player in which they are to be played. These streaming ad content items may be then stitched or integrated (e.g., using a video stitching service) into video content that is to be served to the video player.

In some implementations, the VAST data structure may include several fields that allow ad vendors to capture and track certain metrics related to the video advertisement. In one implementation, the VAST data structure may include a designated field for inserting ad verification APIs that can be executed by the player running the video advertisement. The ad verification APIs allows the player to provide requested details about ad interactions and playback data. The ad interactions may include, for example, information regarding whether a user paused, mutes, expands, clicks on or other type of interaction of the user with the advertisement. The VAST data structure may also include other fields to capture additional useful information to provide to the ad vendors, such as an option to track the viewability on their video ads, error tracking information to provide additional troubleshooting support associated with a playback of the video ads, a time stamp macro and format to enable more consistent time-sensitive tracking of when the video ads are accessed as well as other type of fields associated with a display of the video advertisements.

FIG. 1 depicts a high-level component diagram of a networked computing system 100 in accordance with one or more aspects of the disclosure. As shown, the networked computing system 100 includes an ad-serving platform 110, which is optionally implemented on and/or includes one or more network servers, such as ad server-1 130-1 and ad server-2 130-2, that are connected to network 115. In one implementation, the network servers may be physical or virtual machines in a cloud computing environment connected to network 115. The network 115 may be a private network (e.g., a local area network (LAN), a wide area network (WAN), intranet, etc.) or a public network (e.g., the Internet) or any combination thereof. In some implementations, the ad servers 130-1 and 130-2 may include a processor (not shown) that executes instructions stored in a processor-accessible memory (e.g., RAM) so as to configure the servers to implement at least a portion of the functionality of the ad-serving platform 110 described herein. The servers may thus be capable of sending and receiving data over network 115, such as the Internet, and, as such, is understood as having network interface components comprising hardware configured to enable communications over the network 115, including by way of example and not limitation, data packets constructed in accordance with a network protocol.

In some implementations, the networked computing system 100 may also include one or more computing devices, such as client device 101, coupled to network 115. Users can employ various types of devices to connect to the network 115. Examples of these devices may include, but are not limited to, computers, smart phones, tablet computers, smart televisions that are capable of contenting to the Internet, and etc. In some implications, the users may view Internet-based content, such as streaming content 102, on a display associated with the client device 101 using a browser 107. This streaming content may include, for example, graphics, text, video broadcast, radio show, or other type of Internet-based content.

In some implementations, the client device 101 may be used to receive the streaming content 102 from a content publisher 104 via the network 115. In some implementations, the content publisher 104 is a general content server that receives requests for content (e.g., music, video, graphics, text, etc.). When a user's client device requests content from the content publisher 104, a number of variables may be provided to the content provider in connection with the user's request. The variables may include, but not limited to, a category corresponding to the content of the content request (e.g., arts, business, computers, arts-movies, arts, music, etc.), the content age, content type (e.g., text, graphics, video, audio, mixed media, etc.), geo-location information associated with the client device 101, as well as other information related to the playback capabilities of the client device 101. In response to the request from the client device 101, the content publisher 104 retrieves the requested content and provides this content 102 to the client device 101 for playback via the network 115.

At some point during content playback, either before (pre-roll), in the middle of (mid-roll), or after (post-roll) a portion of the content, the client device 101 or server device reaches a cue to insert an ad (such as a video advertisement) into the streaming content 102 and uses a network communication protocol, such as HTTP, to send an ad request 109 for the ad. In response, the content publisher 104 can submit a request for advertisements to an advertisement server in an ad-serving platform 120. For example, the request may be sent to a primary ad server such as ad server-1 130-1, which may be the video publisher's ad server or a supply-side-platform (SSP) often used by online publishers to help them sell and distribute, video and mobile ads. In some implementations, the ad may include in-stream advertisement content, such as video and/or audio clip(s), video overlays, for example, an interactive small web format (SWF) file that allows additional functionality to displayed content, such as clicking an overlay which pops up a browser window directed to a selected address, interactive user interfaces, for example a share button that allows users to share the content, and/or an audible overlay that is added to an audio file and/or to the soundtrack of a multimedia file and other types of advertisement content.

The request from the content publisher 104 for ads may include a video ad serving template (VAST) request 120 that is compliant with a VAST protocol. The VAST request 120 is capable of being received by an ad server of the ad-serving platform 110. The content publisher 104 may issue the VAST request to the primary ad server, such as ad server-1 130-1 requesting advertisement content that is to be returned to the client device 101. A VAST response 180 is issued by the ad-serving platform 110 in response to and based on the VAST request 120. When the VAST response 180 is received at the client device 101, the device 101 executes the advertisement content within a run time environment of the device as specified in the VAST response 180. Thus, the client device 101 is only an executor of the advertisement content specified by the ad server of the ad-serving platform 110.

The VAST response 180 is a VAST-formatted extended markup language (XML) document. The VAST response 180 may be based, at least in part, on JavaScript included in a web page or application code that describes an advertisement to be displayed in, over, or around content 102 serviced to the client device 101. The VAST response 180 preferably complies with a VAST specification so that it can be executed within the run time environment of client device 101 that is also compliant with the VAST specification. In some implementations, the VAST response 180 may be arranged as a particular type of response, such as either a VAST inline response 160 or a VAST wrapper response 150. When executed by the client device 101, the VAST response 180 is arranged to call a data collection and processing application based on the arranged type.

A VAST inline response 160 that includes the video ad to be displayed. For example, the VAST response 180 may include media content of any type, e.g. video content, audio content, etc., for playback. The VAST Inline response 160 may comprise a plurality of sequential "Linear Ads" forming an "Ad Pod." A linear ad refers to video-formatted ads that can play linearly within the streaming content 102, meaning before the streaming content 102, during a break, or after the streaming content 102, and an ad pod refers to a sequence of linear ads played back-to-back, like a commercial break with multiple ad spots on TV. In other implementations, the VAST Inline response 160 may comprise "NonLinear Ads." Nonlinear ads usually cover the bottom or top fifth of a display on the client device 102 and can be text, images or interactive ads. Using an API or other kinds of mechanisms, the client device 102 may allow user-initiated interactions with a nonlinear ad to stop content video playback. Nonlinear ads may appear at some point between the streaming content 102 start and end (mid-roll positions) and generally disappear after a few (e.g., 10-20) seconds if there is no interaction.

A VAST wrapper response 150 provides a mechanism (e.g., a uniform resource identifier (URI)) for one ad server (e.g., ad server-1 130-1) to redirect the client device 101 to another, secondary ad server (e.g., ad server-2 130-2) for a secondary VAST request 155 to retrieve an ad, multiple ads, or another VAST Wrapper. One ad server may be redirected to another for a variety of reasons. For example, the first ad server may have selected a specific advertiser's campaign to fill the inventory. In this case the secondary VAST request 155 may redirect the client device 101 to the secondary ad server-2 130-2 to return specific ads from a particular ad campaign. In some aspects, the first ad server 130-1 is delegating a specific piece of inventory for either a single ad or an entire pod of ads to the secondary ad server-2 130-2 to fill with any ads that are within an established agreement between the two parties. In other implementations, an ad server may not have an ad to return and may return a VAST wrapper response 150 that redirects the client device 101 to a backfill provider for the ads.

When serving an ad involves a chain of wrappers, an infinite loop is possible where a chain of Wrappers never results in a final inline VAST response that includes an ad to return in the VAST response 180. In some situations, a finite number of wrappers resulting in an inline response may be used as a decisioning mechanism to find an ad instead of delivering the ad as required. In such cases, the decisioning mechanism may never return an ad or may take too long to return the ad. In general, wrappers should be limited to a certain number before resulting in an inline response. If the client device 101 detects more than a certain number of wrappers (e.g., 5), the client device 101 may reject any subsequent responses in the chain. In some implementations, the client device 101 may provide an error code to indicate that the wrapper limit was reached, and move on to a different option for an ad. In this regarding, error codes may be sent for all wrappers in the chain that was provided in the VAST response 180. In some implementations, the VAST response may include timeout settings to prevent an ad from taking too long to load. For example, when a VAST response fails to produce an ad within a determined threshold timeframe, the client device 101 may be direct to reject the ad and to send an error code to indicate that no ad was produced in the determined timeframe.

In some implementations, the VAST response 180 may also aid in tracking traffic associated with the ad delivered to the client device 101. Tracking an ad served in VAST format is done using a collection of optional VAST tracking elements 170 at different levels in the VAST response. 180. These tracking elements 170 each contain a URI to a resource file or location on a server defined by the ad server that sent the VAST response 180. In some implementations, the resource file may be a transparent pixel image (e.g., a tracking pixel) that when called, records an event that is specific to that tracking pixel. In one implementation, the client essentially makes an HTTP call to the tracking URL provided for each event. For example, when the user hits mute, the corresponding tracking pixel will be fired. When the ad completes 25%, the firstQuartile tracking pixel will be fired and so on.

The client device 101 may request the tracking pixels at appropriate times during the execution of the VAST response 180. Most tracking elements 170 are optional for the ad server to include, but if included, the client device 101 is required to request the resource file from the URI provided at the appropriate times, or "fire" that element. An advantage of the tracking elements 170 is it provides advertisers and publishers accurate tracking records for billing, campaign effectiveness, market analysis, and other important business intelligence and accounting, which are important to the success and growth of digital video advertising.

Although the client device 101 may send requests to Ad serving platform to provide tracking elements 170 (e.g., HTTP URLs), the device is not required to do anything with the tracking elements 170 that is returned. The URIs of the tracking elements 170 enable the ad server to share tracking information with other ad serving systems, such as a vendor or partner ad server employed by the advertiser. When multiple elements are sent, the client device 101 may request all tracking elements 170 at the same time or as close as possible to the same time. Any significant delay between the tracking information requests may result in count discrepancies between ad serving systems.

Sometimes ad servers are adapted to collect metadata from the client device 101 when the tracking element 170 URIs is accessed. For example, the position of a playhead of the client device 101 at the time a tracking element 170 URI is accessed is useful to the ad server and is data that can only be known at the time of the prescribed tracking event is accessed at the client device 101. This data cannot be built into the URI at the time the VAST response 180 is built and served. In such cases, the tracking elements 170 may include code or macros that enable the client device 101 to provide certain details to the ad server at the time tracking URIs are accessed.

In some implementations, other elements may be provided from the ad serving platform 110 to the client device 101 in response to ad request 109, such as ad verification elements 172, viewability elements 174 as well as other files associated with the ads. With regards to the ad verification elements 172, they allow advertisers or publishers to place certain code for ad verification. These ad verification elements 172 may support, for example, a JavaScript resource and a Flash resource. In this regard, more than one vendor may use this feature and each vendor uses different verification elements to place code. This script resource enables the client device 101 to provide requested details about ad interaction and playback at the client device 101. In general, any verification code should be executed before the ad is loaded and any interactive creative files should be executed next and before the ad is loaded.

In some implementations, publishers have the option to offer viewable impression tracking on the ad using the viewability elements 174 feature. In some implementations, at least three (3) URIs may be provided to track whether the ad was "viewable," "not viewable," or "view undetermined." The viewability elements 174 may be used by an ad verification vendor as desired. To use this feature, the client device 101 must be able to display the ad in a VAST response according to the instructions provided by the VAST response and according the client device's supported format. For example, the VAST response contains all the known possible format options (Flash, Javascript, a tracking pixel) and the client device indicates which ones it supports. This format support may include, but not limited to, rendering the ad asset(s) correctly, conforming to the ad server instructions in a VAST response including those of any subsequent ad servers called in a chain of VAST wrapper responses providing that the responses are VAST-compliant, responding to supported user-interactions, sending appropriate tracking information back to the ad server, and supporting XML conventions such as standard comment syntax (e.g., acknowledging VAST comments in the standard XML syntax).

In some implementations, the client device 101 checks for code in the tracking elements 170 section of the VAST response 180 and attempts to execute any verification elements before the linear ad creative is executed. If the verification elements cannot be executed, an error URI may be sent. The error URI provides a tracking resource (e.g., various error codes) that enables the client device 101 to provide feedback to ad servers when an ad cannot be served. The error-tracking resource is called when the client device 101 is unable to display the ad. If an error occurs while trying to load an ad and an error is provided, the device sends a request to the error URI. For example, this is provided when the VAST response returns an empty inline response after a chain of one or more wrapper ads. For example, this can happen when after the chain of wrappers is "executed", the final wrapper is still unable to find a suitable ad for that particular request/inventory.

Figure 2:
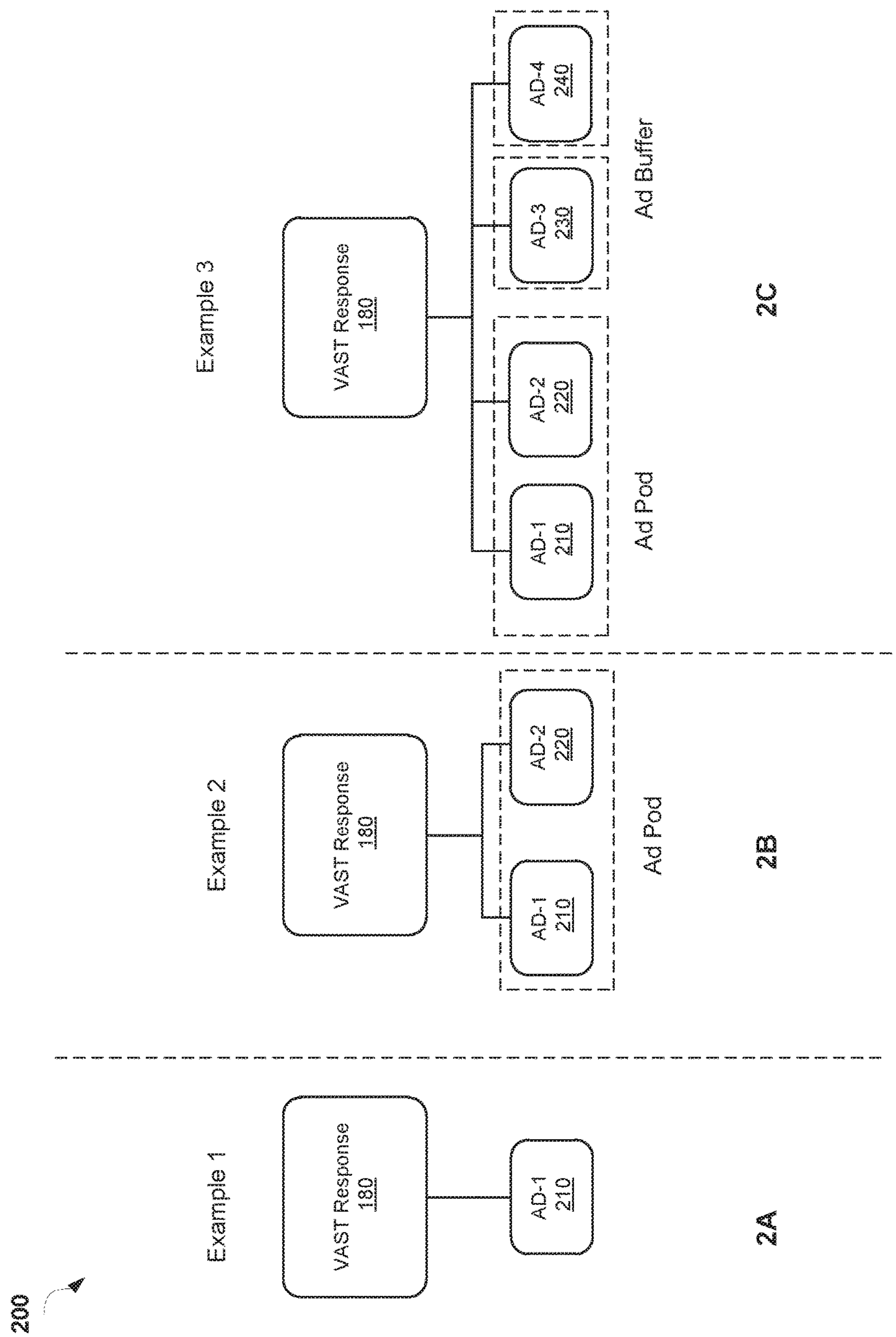
FIG. 2 depicts examples an advertisement pod in accordance with one or more aspects of the disclosure.

FIG. 2 depicts examples 2A, 2B and 2C of advertisement pods in accordance with one or more aspects of the disclosure. While a single ad element 210 as shown in 2A represents the most common VAST response 180, multiple ads may be included as either stand-alone ads or a pod of ads, or a mix of both. Ads in a pod are distinguished by using a sequence attribute for an ad, denoting which ad plays first, second, and so on. If the player for the ads, such as client device 110 supports ad pods, sequenced ads are played in numerical order and all ads in the pod should be played to the best of the player's ability. For example, the ads in the ad pod of 2B may be played in order from ad-1 210 to ad-2 220. In this regard, all sequence values in the VAST response are unique. In some implementations, non-sequenced ads, are stand-alone ads and considered part of an ad buffer, as shown in 2C, from which the player may select one or more ads to play in any order. In one implementation, the stand-alone ads may be included in VAST response 180 with ads (e.g., ad-3 230 and ad-4 240) from the ad buffer that may be used to substitute an ad in the ad pod when an ad cannot be played.

If the player cannot display an entire ad pod or any stand-alone ads, it can decline from loading the ad resources and use the error URI, if provided, to notify the ad server. In some implementations, the player may elect to truncate any ads at the end of an ad pod if either: the ads cannot be played because they cannot physically fit into the ad break in the stream (such as when time is limited in a live stream) or if the pod violated any limits specified by the player request (for example: number of ads to return, or maximum pod duration). Should an ad in the ad pod fail to play, the player may substitute an un-played standalone ad from the VAST response 180. If stand-alone ads are unavailable, the player may move on to the next ad in the ad pod to satisfy the ad request to service and ad into the video stream displayed at the player.

Figure 3:
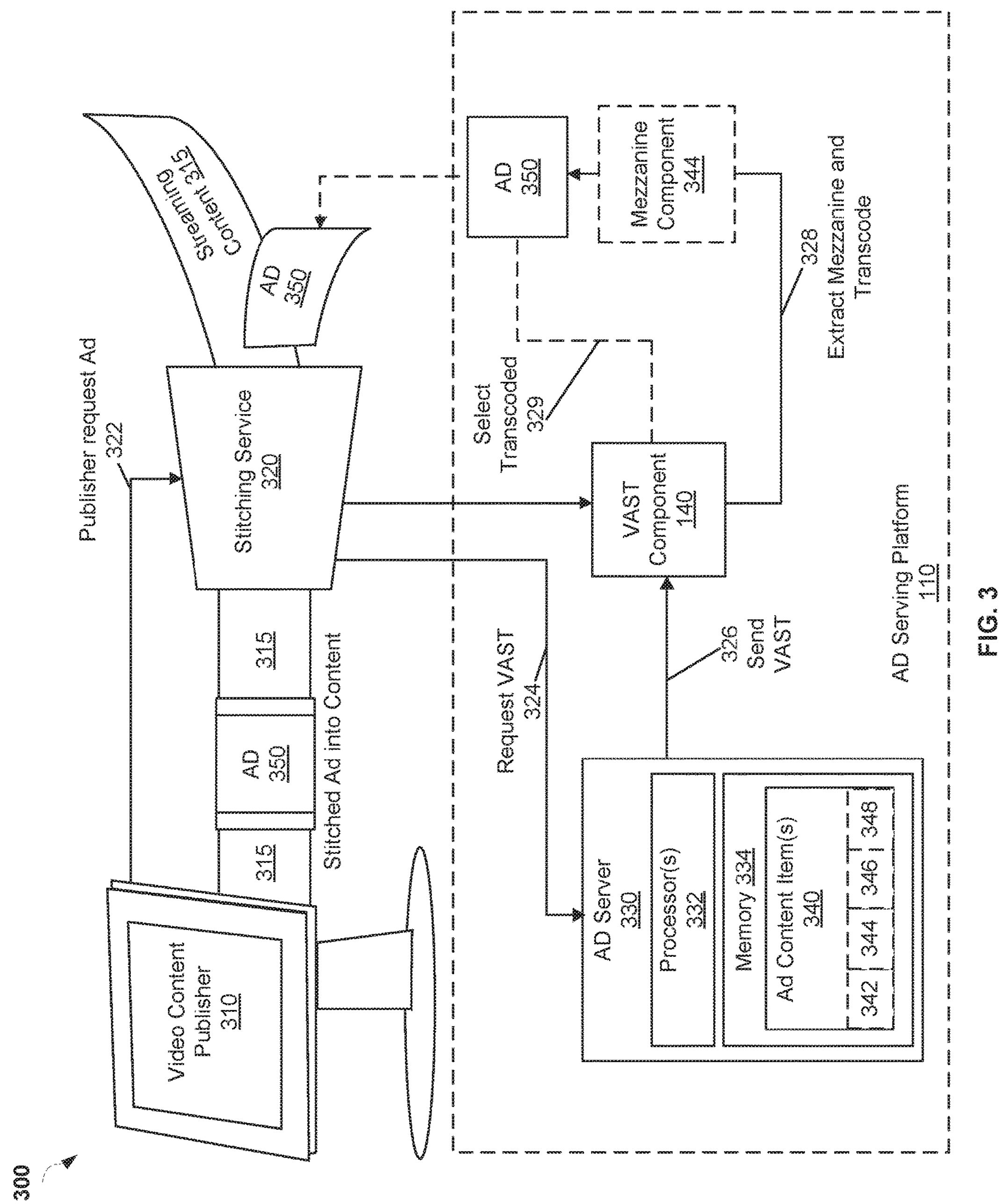
FIG. 3 depicts a system to support video ad serving into video streams in accordance with one or more aspects of the disclosure.

FIG. 3 depicts a system 300 to support video ad serving into video streams in accordance with one or more aspects of the disclosure. As shown in this example, the system 300 may include ad-serving platform 110 of FIG. 1 for which a video content publisher 310 can submit a request for advertisements to include in some streaming content 315. Various techniques described above with respect to the ad-serving platform 110 generally relate serving an ad directly to a client device that user client side tracking. With client-side tracking, the client device, such as client device 101 of FIG. 1 sends tracking information back to the ad server by executing various tracking elements 170 in a VAST response 180 received from the ad-serving platform 110. In today's wide array of client devices, many devices may not be capable of executing dynamic ad responses or tracking impressions and interactions. In these cases, an intermediary server, such as stitching service 320, is needed to insert ads dynamically into the video stream (streaming content 315) published by the video content publisher 310.

A stitching service 320 (also referred to as server-side ad insertion) can stitch video content and ads together in a single stream on a server device. This streamlines the ad-delivery process because ads are stitched to content on the back end through a single source, for example, in a cloud computing environment, rather than requiring the video content publisher 310 to build individual software development kits (SDKs) across disparate devices or operating systems. After the advertising material is stitched into the content, the content may be transmitted with the inserted advertising content to the client device, such as client device 101. An advantage of using the stitching service 320 is that it allows the video content publisher 310 to bypass browser or device-level integration issues related to the disparate devices or operating systems that may be used to execute ads from the ad-serving platform 110. It also has the advantage of moving complex ad decisioning from simple, low capacity devices over to the ad serving platform.

As shown, the ad-serving platform 110 may include one or more ad serves, such as ad server 330, for transmitting ads to the stitching service 320 to stitch into the streaming content 315. Ad server 330 may be a server computing device that includes a processor 332 that executes instructions stored in a processor-accessible memory 334 so as to configure the server to implement at least a portion of the functionality of the ad-serving platform 110 described herein. "Processor" or processing device herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. Although, for simplicity, a single processor 332 is depicted in FIG. 3, in some other embodiments the system 300 may comprise a plurality of processors.

In some implementations, a VAST component 140 is generated by the ad-serving platform 110 in response to and based on a request sent to the ad server 330 for ads. The VAST component 140 may be a data structure (e.g., a XML document or file) that is compliant with a VAST protocol. As discussed above, the VAST component 140 may be arranged as a particular type of VAST response, such as either a VAST inline response 160 or a VAST wrapper response 150. In one implementation, an ad content item 340 comprising components for the video advertisement may be identified based on the VAST component 140. For example, the ad server 330 may include a plurality of ad content items 340 associated with a variety of advertisements for particular advertisers. Although the ad content items 340 are shown in FIG. 3 as being in memory 334 of the ad server 330, all or part of the ad content items 340 may be stored, for example, in a data server that is separate from the ad server 320 processing the request 324 and accessible by the server via a network connection.

Each ad content item 340 may comprise a number of components for a particular ad that includes, but not limited to, a rich media component 342, a mezzanine component 344, an interactive creative component 346, a universal ad identifier 348 as well as other information related to the advertisements. In some implementations, the rich media component 342 may include one or more ready-to-serve video files associated with the advertisement, the mezzanine component 344 describing characteristics of an audio portion and video portion of the video rich media component 342, the interactive creative component 346 comprises information characterizing interactive capabilities of the rich media component 342, and the universal ad identifier 348 is unique creative identification that can span multiple systems for extending digital video tacking across different platforms. Aspects of these components 342-348 of the ad content items 340 are further discussed below.

Over the years as digital video technology advances, the media files placed in a VAST component have come to include complex files that require interactive API integration. Players not equipped with the technology to execute such files may be unable to play the ad or execute interactive components. In this regarding, the linear video files of the rich media component 342 have been separated from the interactive components that require API integration. An advantage of separating these files is that it enables the ad to play in more players and improves ad play performance. These rich media files of the rich media component 342 may be configured in several ways. In one implementation, the rich media component 342 may include a video file associated with a video advertisement used in ad-stitching by the stitching service 320. In another implementation, in addition to the three ready-to-serve files used, the mezzanine component 344 may include a URI to the raw video file. In yet another implementation, in addition to at least one ready-to-serve video files of the rich media component 342 use the interactive component 346 to include a URI to the interactive media file and specify the API framework that is needed to execute the file. In this regard, when interactive files are included in the VAST response, they should be executed before any video files are executed by the player.

With respect to the rich media component 342, the video file may include three (3) elements with each element comprising a URI to a ready-to-serve video file at quality levels for high, medium, and low. In this regard, ad adaptive bitrate streaming file featuring files at the three quality levels may also be provided for the ready-to-serve files. A ready-to-serve video file is a video file that is transcoded to a level of quality that can be transferred over an internet connection within a reasonable time for viewing. Each ready-to-serve file may be of the same type (e.g., Multipurpose Internet Mail Extension (MIME)) or different types. If different MIME type files are made available for the video advertisement, three ready-to-serve files may be included for each MIME type separately. An advantage of the ready-to-serve video files is that it allows a video player, such as client device 101, to quickly identify the appropriate file needed for a given environment associated with the player.

With respect to the mezzanine component 346, the ad-serving platform 110 may use a raw mezzanine file associated with the component to transcode the ad at quality levels specific to the payback capabilities of certain environments. In some implementations, the mezzanine file describes characteristics of an audio portion and video portion of the video advertisements. The mezzanine component 346 is used to transcode the raw video files associated with the video advertisement so that they can be played in the systems supported by the video player and should not be used for direct ad playback. For example, transcoding of the raw video files may include converting the raw video files associated with the ad content item 340 into a plurality of transport streaming items comprising a representation of the video advertisement in context with the playback attributes of the player and the device associated with the request from the video content publisher.

In some implementations, the mezzanine component 346 is a media container for the mezzanine file in which a publisher can use to produce the best quality file where needed. The mezzanine file is used by the stitching service 320 in ad-stitched executions and whenever a publisher requires its use. If no mezzanine file is available, the mezzanine component 346 may be excluded from the VAST component 140 associated with the video advertisement. In such cases, publishers that require the mezzanine file to be used may ignore the VAST response when the mezzanine component 346 is not provided. If an ad is rejected for this reason, an error code may be used to communicate the error when an error URI and macro is provided.

For any ad that uses interactive APIs for any interactive capabilities, the interactive creative component 348 element is used to identify the file and the framework needed for execution of the APIs. By providing the interactive portion for a media file in a section of VAST response separate from the video file, the ad-serving platform 110 enables players to more easily play the video file when no support is available to execute the interactive APIs. This is particular helpful for players that work with the stitching service 320 that make ad calls from a server on behalf of the player. The player should attempt to execute the interactive creative component 346 before attempting to load any of the rich media components. If the interactive creative component 348 cannot be executed, the player should trigger any included error URIs and use a particular error code when macros are provided.

The universal ad identifier 348 is used to provide a unique creative identifier that follows a video advertisement as well as related data from system to system across different media platforms. This identifier 348 may be generated by an authoritative program, such as the Advertising Digital Identification (AD-ID) association, or by other types of creative ID registration systems. The identifier 348 may be generated through a secure, web-accessible database associated with the authoritative program. The identifier 348 may include attribute values to identify a licensed advertiser in order for them to track their advertisements. In some implementations, the stitching service 320 may rely on a unique creative identifier for managing the mezzanine component and its cache of transcoded files for stitching into a video stream. In this regard, if the advertisement is changed in any way, it should be served with a new creative identifier.

In operation of system 300, the stitching service 320 may receive a request 322 from the video content publisher 310 for an ad to include in some streaming content 315. In response, the stitching service 320 may send a request to the ad-serving platform 110 for an ad 350 to stitch into the content 315. In some implementations, the request from the content publisher 104 for ads may include a VAST request 324 that is compliant with a VAST protocol. The VAST request 324 is capable of being received by a primary ad server 330 of the ad-serving platform 110. The ad server identifies an ad content item 340 associated with the ad 350 and sends a VAST component 140 that includes with a mezzanine file and ready-to-serve files. In some implementations, the universal ad identifier 348 associated with the ad content item 340 may be used to identify whether the transcoded data is available or not. If the transcoded data for the ad 350 is not available (e.g., this is the first time the ad 350 has been used by the ad-serving platform 110), the mezzanine component 344 is extracted 328 and transcoded in context with the playback attributes associated with the request from the video content publisher 310. In this case, the ad is skipped and the next available ad is played instead. The ad may be skipped because it may take some time for the transcoding to occur, and would result in a bad user experience if the player waited for the transcoding to complete. Thus, after the first time, the transcoded video may be ready and cached so that future requests for that ad can perform faster.

If the stitching service 320 has already received and transcoded the mezzanine file for the ad 350 in a previous request, the transcoded data associated with the AD 350 is selected by the stitching service 320. In this regard, if the identifier from the VAST component 140 matches the unique creative identifier for the ad 340 that has already been transcoded, the stitching service 320 selects, for example, from cache memory, the pre-transcoded file (e.g., a plurality of transport streaming items associated with a representation of the video advertisement) that is already in the system 300. Thereafter, the stitching service 320 stitches or integrates the ad 350 into the content stream 315 and serves the content and ad to the player in one continuous stream.

Figure 4:
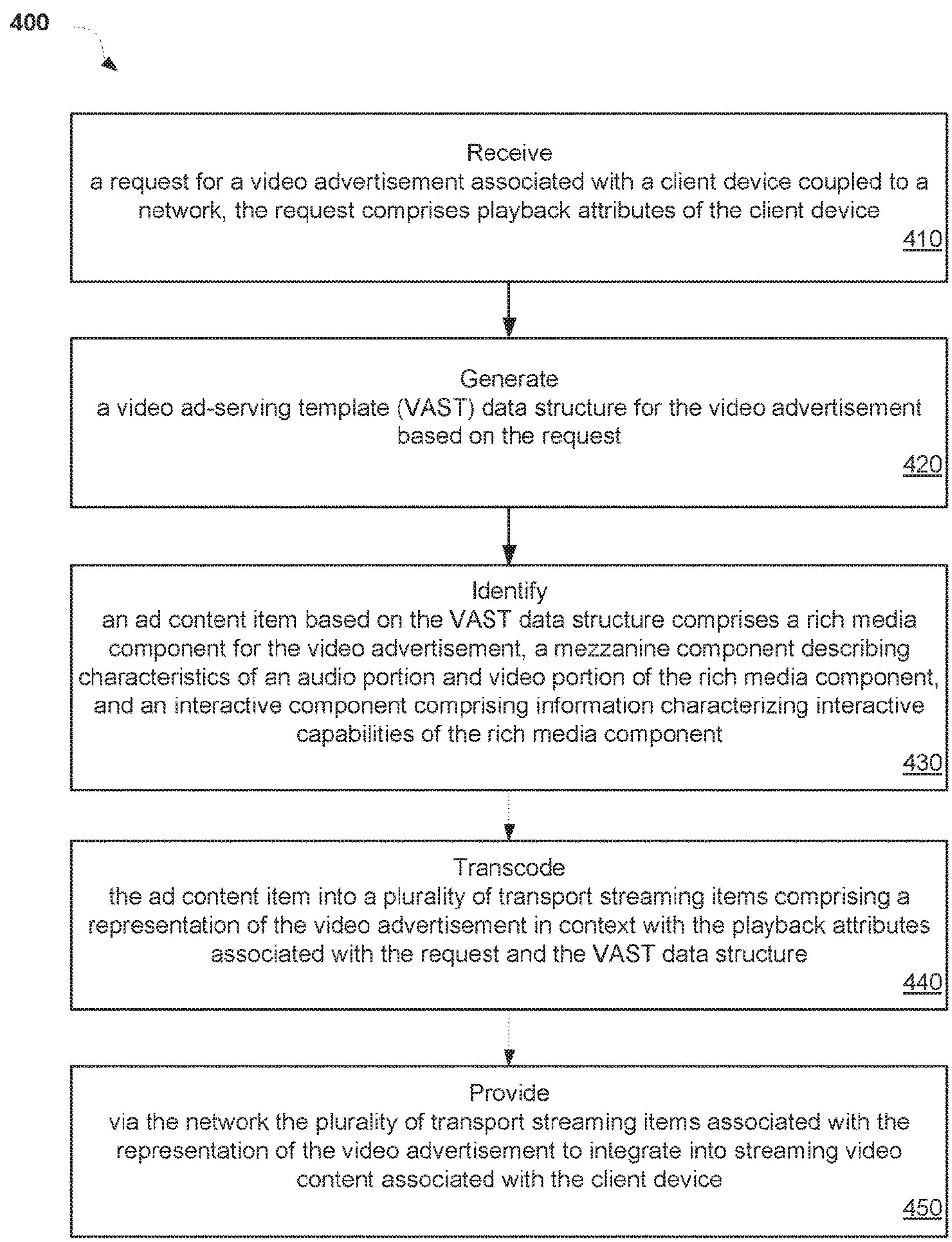
FIG. 4 depicts a flow diagram of a method for supporting video ad serving into video streams in accordance with one or more aspects of the disclosure.

FIG. 4 depicts a flow diagram of one embodiment of a method 400 in accordance with one or more aspects of the disclosure. In one embodiment, a processing device, such as an ad server, of the ad-serving platform 120 of FIG. 1 may perform method 400 for supporting video ad serving into video streams. The method 400 may be performed by processing logic that may comprise hardware (circuitry, dedicated logic, etc.), software (such as is run on a general purpose computer system or a dedicated machine), or a combination of both. Alternatively, in some other embodiments, some or all of the method 400 might be performed by other components of the ad-serving platform 120. It should be noted that blocks depicted in FIG. 4 can be performed simultaneously or in a different order than that depicted.

Method 400 begins in block 410 where a request for a video advertisement associated with a client device coupled to a network is received. The request comprises playback attributes of the client device. For example, the playback attributes may include attributes about the user viewing the content, as well as the content itself, which can be used to determine which ad to send down to the client device. A video ad-serving template (VAST) data structure is generated for the video advertisement based on the request in block 420. An ad content item is identified in block 430 based on the VAST data structure. The ad content item comprises a rich media component for the video advertisement, a mezzanine component describing characteristics of an audio portion and video portion of the rich media component, and an interactive component comprising information characterizing interactive capabilities of the rich media component. In block 440, the ad content item is transcoded into a plurality of transport streaming items comprising a representation of the video advertisement in context with the playback attributes associated with the request and the VAST data structure. In block 450, the plurality of transport streaming items associated with the representation of the video advertisement is provided to integrate into streaming video content associated with the client device.

Figure 5:
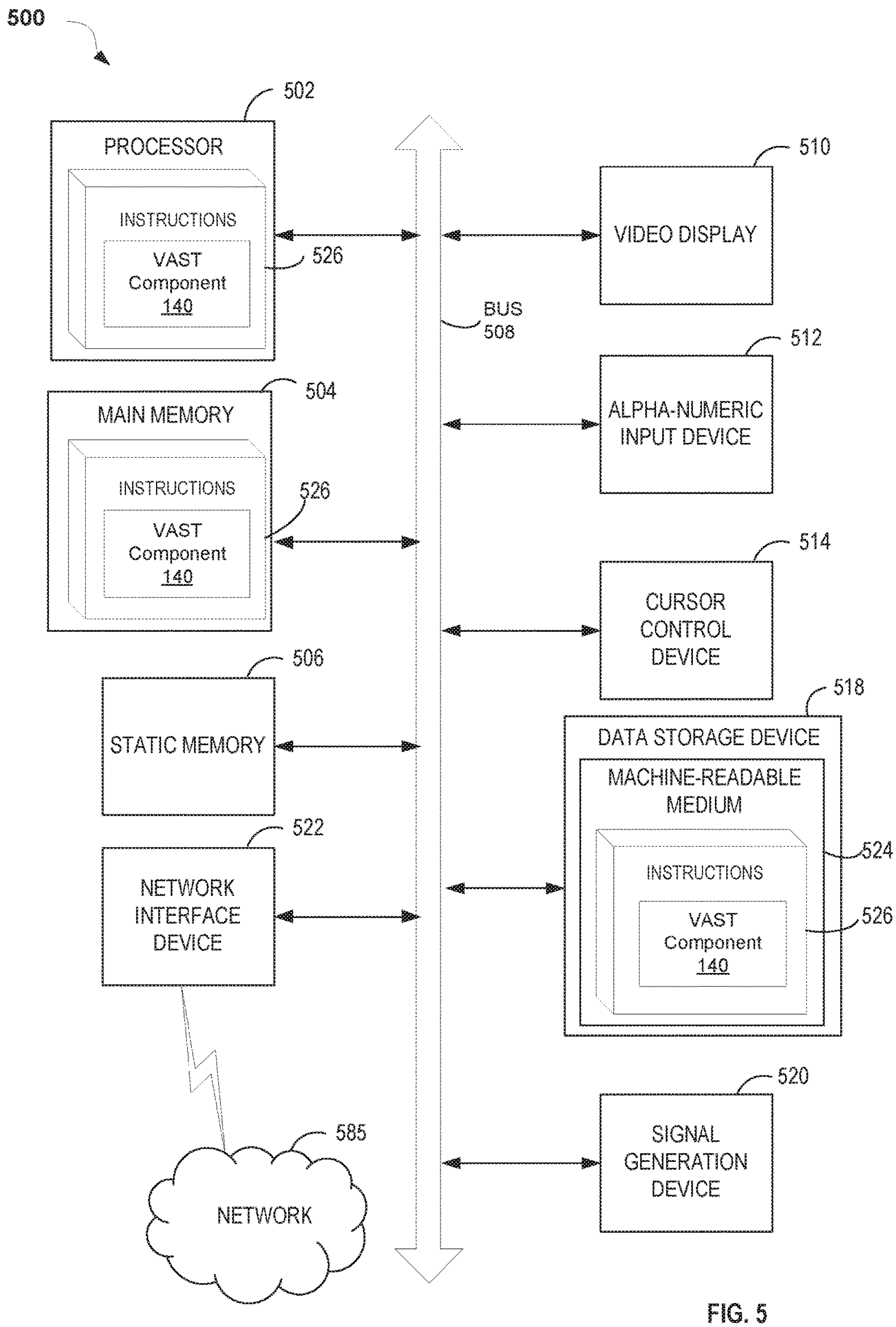
FIG. 5 depicts a block diagram of an example computer system operating in accordance with one or more aspects of the disclosure.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502 (which may correspond to processing device within the ad-serving platform 120 of FIG. 1), a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508. In a further aspect, the computer system 500 may include a processing device 502 (which may correspond to processing device 332), a memory (which may correspond to memory 334) comprising a main memory 504 (e.g., random access memory (RAM)), a non-volatile (static) memory 506 (e.g., read-only memory (ROM) or electrically-erasable programmable ROM (EEPROM)), and a data storage device 518, which may communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic for performing the operations and steps discussed herein.

Computer system 500 may further include a network interface device 522. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

Data storage device 518 may include a machine-readable storage medium (or more specifically a computer-readable storage medium) 524 having one or more sets of instructions embodying any one or more of the methodologies of functions described herein, including instructions for supporting video ad serving into video streams including the VAST module 140 of FIG. 1 and FIG. 2. In some implementations, the VAST module 140 may also reside, completely or at least partially, within main memory 504 and/or within processing device 502 during execution thereof by computer system 500; main memory 504 and processing device 502 also constituting machine-readable storage media. The episodic event detector 119 may further be transmitted or received over a network 585 via network interface device 522.

Instructions 526 may also reside, completely or partially, within main memory 504 and/or within processing device 502 during execution thereof by computer system 500, hence, main memory 504 and processing device 502 may also constitute machine-readable storage media.

While a non-transitory machine-readable storage medium 528 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the disclosure. The term "machine-readable storage medium" shall accordingly be taken to include, but not be limited to, solid-state memories, and optical and magnetic media.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "identifying", "transcoding", "providing", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method comprising:

receiving, by a processing device, a request for a video advertisement associated with a client device coupled to a network, the request comprises playback attributes of the client device;

generating, by the processing device, a video ad-serving template (VAST) data structure for the video advertisement based on the request;

identifying, by the processing device, an ad content item based on the VAST data structure, the ad content item comprises a rich media component for the video advertisement, a mezzanine component describing characteristics of an audio portion and video portion of the rich media component, and an interactive component comprising information characterizing interactive capabilities of the rich media component;

transcoding, by the processing device, the ad content item into a plurality of transport streaming items comprising a representation of the video advertisement in context with the playback attributes associated with the request and the VAST data structure; and providing, via the network, the plurality of transport streaming items associated with the representation of the video advertisement to integrate into streaming video content associated with the client device.

2. The method of claim 1, further comprising generating a response for the request based on the VAST data structure, the response pointing to a first ad server for requesting the video advertisement.

3. The method of claim 2, further comprising responsive to detecting that the first ad server cannot satisfy the request:

generating a wrapper for the response to redirect the request to a second ad server for requesting the video advertisement; and determining a threshold timeframe for the second ad server to produce an ad before generating an error alert.

4. The method of claim 1, wherein the ad content item further comprises a unique digital identification to identify the video advertisement across different media platforms.

5. The method of claim 1, wherein the VAST data structure comprises a verification application interface to provide data regarding interactions with the video advertisement at a display of the client device.

6. The method of claim 1, wherein the VAST data structure comprises tracking application interface to track impression related to a viewability of the video advertisement.

7. The method of claim 6, wherein the tracking application interface is adapted to capture error-tracking information associated with a playback of the video advertisement at the client device.

8. The method of claim 6, wherein the tracking application interface is adapted to identify a date and time the video advertisement is accessed.

9. A system comprising:

a memory to store data related to a plurality of video advertisements; and a processing device, coupled to the main memory, to:

receive a request for a video advertisement associated with a client device coupled to a network, the request comprises playback attributes of the client device;

generate a video ad-serving template (VAST) data structure for the video advertisement based on the request;

identify an ad content item based on the VAST data structure, the ad content item comprises a rich media component for the video advertisement, a mezzanine component describing characteristics of an audio portion and video portion of the rich media component, and an interactive component comprising information characterizing interactive capabilities of the rich media component;

transcode the ad content item into a plurality of transport streaming items comprising a representation of the video advertisement in context with the playback attributes associated with the request and the VAST data structure; and provide, via the network, the plurality of transport streaming items associated with the representation of the video advertisement to integrate into streaming video content associated with the client device.

10. The system of claim 9, wherein the processing device is further to generate a response for the request based on the VAST data structure, the response pointing to a first ad server for requesting the video advertisement.

11. The system of claim 10, wherein the processing device is further to, responsive to detecting that the first ad server cannot satisfy the request:

generate a wrapper for the response to redirect the request to a second ad server for requesting the video advertisement; and determine a threshold timeframe for the second ad server to produce an ad before generating an error alert.

12. The system of claim 9, wherein the ad content item further comprises a unique digital identification to identify the video advertisement across different media platforms.

13. The system of claim 9, wherein the VAST data structure comprises a verification application interface to provide data regarding interactions with the video advertisement at a display of the client device.

14. The system of claim 9, wherein the VAST data structure comprises tracking application interface to track impression related to a viewability of the video advertisement.

15. The system of claim 14, wherein the tracking application interface is adapted to capture error-tracking information associated with a playback of the video advertisement at the client device.

16. The system of claim 14, wherein the tracking application interface is adapted to identify a date and time the video advertisement is accessed.

17. A non-transitory computer-readable storage medium comprising instructions that when executed, by a processing device, cause the processing device to:

receive, by the processing device, a request for a video advertisement associated with a client device coupled to a network, the request comprises playback attributes of the client device;

generate a video ad-serving template (VAST) data structure for the video advertisement based on the request;

identify an ad content item based on the VAST data structure, the ad content item comprises a rich media component for the video advertisement, a mezzanine component describing characteristics of an audio portion and video portion of the rich media component, and an interactive component comprising information characterizing interactive capabilities of the rich media component;

transcode the ad content item into a plurality of transport streaming items comprising a representation of the video advertisement in context with the playback attributes associated with the request and the VAST data structure; and provide, via the network, the plurality of transport streaming items associated with the representation of the video advertisement to integrate into streaming video content associated with the client device.

18. The non-transitory computer-readable storage medium of claim 17, wherein the processing device is further to generate a response for the request based on the VAST data structure, the response pointing to a first ad server for requesting the video advertisement.

19. The non-transitory computer-readable storage medium of claim 18, wherein the processing device is further to, responsive to detecting that the first ad server cannot satisfy the request:

generate a wrapper for the response to redirect the request to a second ad server for requesting the video advertisement; and determine a threshold timeframe for the second ad server to produce an ad before generating an error alert.

20. The non-transitory computer-readable storage medium of claim 17, wherein the ad content item further comprises a unique digital identification to identify the video advertisement across different media platforms.

* * * * *